US007744797B2

(12) United States Patent
Burchard

(10) Patent No.: US 7,744,797 B2
(45) Date of Patent: Jun. 29, 2010

(54) INTERLAMINAR STRUCTURE FOR SECURITY ELEMENT

(75) Inventor: Theo Burchard, Gmund am Tegernsee (DE)

(73) Assignee: Giesecke & Devrient GmbH, Munich (DE)

( * ) Notice: Subject to any disclaimer, the term of this patent is extended or adjusted under 35 U.S.C. 154(b) by 701 days.

(21) Appl. No.: 10/517,492

(22) PCT Filed: Jun. 6, 2003

(86) PCT No.: PCT/EP03/05981

§ 371 (c)(1),
(2), (4) Date: Jan. 9, 2006

(87) PCT Pub. No.: WO03/106185

PCT Pub. Date: Dec. 24, 2003

(65) Prior Publication Data

US 2006/0145467 A1 Jul. 6, 2006

(30) Foreign Application Priority Data

Jun. 12, 2002 (DE) ................................ 102 26 177

(51) Int. Cl.
*B29C 45/14* (2006.01)

(52) U.S. Cl. ......................... 264/229; 264/291; 283/57; 283/58; 283/59; 283/62; 283/72; 283/81; 283/82; 428/195.1; 428/209; 428/916

(58) Field of Classification Search ................. 264/229, 264/291; 283/57, 58, 59, 62, 72, 81, 82; 428/195.1, 209, 916
See application file for complete search history.

(56) References Cited

U.S. PATENT DOCUMENTS 3,601,913 A 8/1971 Pollock (Continued)

FOREIGN PATENT DOCUMENTS

DE 2653196 A1 5/1978

(Continued)

OTHER PUBLICATIONS

Merriam-Webster Collegiate Dictionary, "register", 985 (10th ed. 1996), available at http://www.merriam-webster.com/dictionary/register. (online version is attached as "MWDictionary—register.pdf").*

(Continued)

*Primary Examiner*—Mark Ruthkosky
*Assistant Examiner*—David J Joy
(74) *Attorney, Agent, or Firm*—Rothwell, Figg, Ernst & Manbeck, P.C.

(57) ABSTRACT

A multilayer security element with at least two security features exactly disposed to each other is produced by the security features being present on separate carrier foils (100, 200) and the carrier foils being laminated with each other in such a way that the security features in the layer compound are disposed to each other in register. As to achieve an exact register of the security features, each carrier foil has register marks, with the help of which the foils are controlled relative to each other. The controlling is effected by stretching that carrier foil, the security features of which are running behind relative to the security features of the respective other carrier foil.

10 Claims, 4 Drawing Sheets

U.S. PATENT DOCUMENTS

| | | | | |
|---|---|---|---|---|
| 3,949,949 | A | 4/1976 | Thompson | |
| 4,420,923 | A | 12/1983 | Moser | |
| 4,536,016 | A | 8/1985 | Ross et al. | |
| 5,093,184 | A * | 3/1992 | Edwards | 428/195.1 |
| 5,509,691 | A | 4/1996 | Kaule et al. | |
| 5,964,970 | A | 10/1999 | Woolwine et al. | |
| 2005/0012326 | A1 * | 1/2005 | Keller et al. | 283/94 |

FOREIGN PATENT DOCUMENTS

| | | | |
|---|---|---|---|
| DE | 3039616 | A1 | 5/1982 |
| DE | 3042709 | A1 | 6/1982 |
| DE | 19804735 | A1 | 8/1999 |
| DE | 10226177 | A1 | 12/2003 |
| EP | 0283043 | A2 | 9/1988 |
| EP | 0 400 902 | A1 | 12/1990 |
| EP | 0400902 | A2 | 12/1990 |
| EP | 1318016 | A1 | 6/2003 |
| GB | 2 287 430 | A1 | 9/1995 |
| GB | 2287430 | A | 9/1995 |
| WO | WO 99/21764 | A1 | 5/1999 |
| WO | WO 01/10701 | A | 2/2001 |
| WO | WO 01/10701 | A2 | 2/2001 |

OTHER PUBLICATIONS

Enclosure of Dec. 23, 2009, Opposition to European Patent No. 1 515 847 (European Patent Application No. 03 759 917.2), Opponent: Fabriano Securities S.R.L., Proprietor: Giesecke & Devrient GmbH, including listing of references E1 thru E-8, cited above, 20 pages.

Letter dated Jan. 4, 2010 to Europaische Patentamt from TBK Patent re: Opposition to European Patent Application No. 03 759 917.2, Opponent: Fabriano Securities S.R.L., Proprietor: Giesecke & Devrient GmbH, including listing of documents E12 thru E20 below, 7 pages.

E12: Affidavit of Mr. Giovanni Caprioglio of Rotomec dated Dec. 21, 2009, 2 pages.

E13: Offer of a machine to Lawson Mardon Morin, Offre Valmet Rotomec Lawson Mardon Morin, Offre No. CAS00B0164 / I, 6 pages.

E14: Invoice for the machine of offer E13, Valmet, Invoice No. 241, dated Oct. 8, 2001, 1 page.

E15: Statement of the R&D-director of Rotomac dated Dec. 21, 2009, 1 page.

E16: German Language Offer and Technical Specification from Rotomec for machine 60040, dated Oct. 19, 1998, 33 pages.

E16a: Excerpt English translation of E16 (German Language Offer and Technical Specification from Rotomec for machine 60040, dated Oct. 19, 1998), Contractual Agreement Rotomec - Mantegazza, 3 pages.

E17: German Language Invoice of Technical Service at the register station of machine 60040 on Sep. 11, 2000, 1 page.

E18: German Language Invoice and Technical report of maintenance at the register station of machine 60040 on Oct. 10, 2001, 2 pages.

E18a: English Translation of job description in E18 (German Language Invoice and Technical report of maintenance at the register station of machine 60040 on Oct. 10, 2001), 1 page.

E19: German Language Invoice and Technical report of maintenance at the register station of machine 60040 on May 2, 2002, 3 pages.

E19a: English Translation of job description in E19 (German Language Invoice and Technical report of maintenance at the register station of machine 60040 on May 2, 2002), 1 page.

E20: Drawing of machine 60040, 1 page.

German Language Letter dated Dec. 31, 2009 to Europaisches Patentamt from E. Landgraf at Elvira Landgraf, Dipl.Ing. regarding an Opposition to European Patent No. 1 515 857 B, 17 pages.

* cited by examiner

INTERLAMINAR STRUCTURE FOR SECURITY ELEMENT

CROSS-REFERENCE TO RELATED APPLICATION

This application is a National Phase of International Application Serial No. PCT/EP03/05981, filed Jun. 6, 2003.

FIELD OF THE INVENTION

The invention relates to a multilayer security element, a layer compound to be further manufactured into such a security element, a method for producing the layer compound and the security element, as well as an object equipped with the security element, in particular document of value, such as bank notes and the like.

DESCRIPTION OF THE BACKGROUND ART

Security elements within the terms of the invention are, for example, security threads and security strips for bank notes and for other documents of value, tear threads for packaging, labels and tags, which are suitable for detecting the authenticity of an object connected with them, in particular, document of value. Documents of value within the terms of the invention can be bank notes, identity cards, checks, passports, travel tickets, admission tickets and the like. But the invention is also suitable for the protection of any other objects of value and their packaging, such as e.g. books, CDs and the like.

Multilayer security elements in the form of security threads find a wide range of use in bank notes. They comprise at least one carrier substrate—normally formed as a transparent plastic film—to which the further layers are applied. These further layers mainly are printed on or, in particular in the case of metallic layers, vapor-deposited, but they can also be, for example, sputtered or sprayed.

Not always are all layers applied all-over. They can be disposed side-by-side and/or one above the other. They can form characters or patterns or can have gaps, either from the outset or as a result of a subsequent partial removal of material, so as to form, for example, a negative writing, which when viewed in incident light is hardly visible, but when viewed in transmitted light produces a clearly visible contrast which is due to the transparency of the carrier substrate. Furthermore, the layers can have optically variable effects and for that purpose can have, in particular, diffraction structures in the form of grating patterns or holograms etc. The layers can also have machine readable security features, such as e.g. electrical conductivity in the case of continuous metallic coatings or in the case of printed layers doped with electrically conductive particles. Additionally or alternatively, they can have magnetic properties and/or luminescent properties, in particular in areas not visible luminescent substances are often used. The machine readable security features can also be formed as locally restricted machine readable code, for example bar code.

A basic matter of concern when producing such multilayer security elements is to achieve a side-independent appearance, so that when fitting the security elements to or embedding them in the objects to be such secured no particular measures become necessary for their application with regard to trueness to side. This problem in particular arises when incorporating security threads as so-called window threads into papers of value, in particular bank notes, since these threads and strips tend to twist.

In the case of a simple metalized security thread with hidden magnetic layer a side-independent appearance is easy to achieve, when, for example, at first a carrier substrate is printed with the magnetic layer and subsequently is metalized all-over on both sides. In this connection it is also known, that firstly a foil is metalized, the magnetic layer is applied onto the metal layer, and then the foil is cut, superimposed and adhesively bonded in a roller laminating plant in such a way as to produce a thread-shaped foil compound with two outside foils, two inside metal layers and one central, i.e. located between the metal layers, double magnetic layer (EP 0 374 763 A2). By means of the two outside foils the coatings are protected against outside influences. Furthermore, the absolutely symmetrical layer structure of the foil compound prevents a curling of the produced thread which would lead to the formation of garlands.

This laminating method, however, is not suitable for complex layer structures, wherein different layers are positioned locally restricted at different places which are disposed in an exact relation to each other. Since the cutting and superimposing of the individual compound foils inevitably leads to the fact, that the different, locally restricted layers will not be disposed exactly regular to each other in the final layer compound.

Therefore, complex layer structures are built on one single carrier material. For example, in WO 92/11142 are described several variants of a security thread with hidden magnetic layer or hidden magnetic code and integrated negative writing.

In the simplest case the negative writing is identically produced in the magnetic layer and in two metal layers which cover the magnetic layer. For this purpose at first an activable printing ink is applied in a usual fashion to the area of the future negative writing on a transparent plastic film. Then a first metal layer is vapor-deposited thereon and a magnetic layer is printed all-over on top of it, the latter then is covered with a second vapor-deposited metal layer. The following activation of the printing ink results in congruent gaps in the three layers located on top of the printing ink. The inner metal coating ensures, that the security thread has, due to the transparency of the carrier foil, the same appearance independent of side.

In case of complex layer structures, in which the negative writing is not produced congruent in all layers, however, it is difficult, to achieve an appearance which is exactly the same from both viewing sides.

Therefore, in case of such complex layer structures at least one, optionally also the two metallic layers are printed in register onto the desired areas (WO 92/11142). The problem here is that the metallically appearing printing inks, e.g. supersilver, are less brilliant than vapor-deposited metal layers and that supersilver does not have a good electrical conductivity. In the event that one of the two metallic layers is a printed layer and the other one is a real, e.g. vapor-deposited metal layer, an exactly side-independent appearance will not be achieved. In the other event, that both metallically appearing layers are printed layers, the optical appearance indeed will be identically in a side-independent fashion, but in total will not be as brilliant as one would desire and also not electrically conductive.

SUMMARY OF THE INVENTION

The problem of the present invention therefore is to provide a multilayer security element, which is adapted to be produced in a simple fashion with a complex layer structure and an at the same time side-independent appearance. The problem of the present invention equally is to provide a layer compound to be further manufactured into such a security element and respective production methods as well as an object equipped with the security element, in particular document of value.

This problem is inventively solved with features disclosed herein. Also disclosed are specified advantageous embodiments and developments of the invention.

Accordingly, on a first carrier foil at least one security feature is produced and on a second carrier foil differing from the first also at least one security feature is produced. Then the two foils are laminated as to form a layer compound. As to ensure the two security features being in a predetermined, regularly disposed position to each other, it is provided, that the carrier foils have register marks in the longitudinal direction and/or also in the transverse direction of the foil, with the help of which the exactly registered joining of the two foils is controlled. For this purpose a first of the two carrier foils is maintained under a predetermined, preferably constant tensile stress, and the second carrier foil in longitudinal direction of the foil is controlled with the help of its register marks as to be in exact register to the register marks of the first foil. Then security elements in the desired form can be severed out from the layer compound, for example in the form of labels, or the layer compound can be divided into threads or strips and wound up onto so-called endless rollers.

The carrier foils can be plastic substrates, e.g. made of PET; also thinkable is a plastic/paper compound, wherein at least one carrier foil consists of paper, e.g. cotton paper.

The security features can be any machine readable features, such as electrically conductive, magnetic, luminescent, and in particular in the not visible spectral region luminescent security features. But also any other security features, such as a negative writing or a print, are possible.

The advantage achieved with the invention is to be seen in the fact, that the manufacturing of the respective security features can be effected irrespective of their design and disposition in the final layer structure and under process conditions which are optimal for the security feature. Their production at no point of time depends on the design or the position of other security features of the same layer compound or how these other security features of the same layer compound are produced. Insofar as not causing problems, of course it is also possible to manufacture different security features on one joint carrier foil. Furthermore, the possibility of the layer compound comprising more than two foils is not excluded, when, for example, the production of three different security features otherwise could not be easily combined. This can be, for example, a security element having two differently coloured metals, disposed in a certain pattern. Each of the metals is vapor-deposited on a carrier foil and structured in the appropriate fashion by etching or washing methods. Subsequently, the carrier foils are laminated according to the inventive method. Preferably, here the metal layers come to lie facing inwardly, so that they are protected by the carrier foils.

The invention can be very advantageously used for the production of security elements, which have internal security features that are accessible only by machine testing, which due to their inherent colour or other properties would spoil the optical appearance of the security element and therefore have to be covered by additional layers. With the aid of the invention a coverage in register and restricted to the areas where required can be effected.

Finally, the invention is suitable in an advantageous fashion for the production of security elements composed of two carrier foils and having security features which must be congruently disposed. This is the case, for example, with a security element the two sides of which have different diffraction structures, the reflection layers of which, in particular metal layers, have a congruent negative writing.

The controlling of the second carrier foil in longitudinal direction of the foil relative to the first carrier foil being under tensile stress preferably is effected by stretching the second carrier foil in longitudinal direction of the foil. If two carrier foils of the same lengths are used, however, there will arise the problem of adjusting in case there are deviations from the being-in-register state in an opposite direction to the longitudinal direction of the foil. Therefore, two preferred embodiments of the invention provide, that either the second carrier foil to be controlled by stretching is shorter than the first carrier foil being under tensile stress, or that the two carrier foils basically have the same length, but the first carrier foil being under tensile stress is steadily, at least slightly stretched. The last-mentioned variant has the advantage, that the two carrier foils normally are charged and stretched with approximately the same tensile stress, the tensile stress exerted to the stretch-controlled second carrier foil is reduced or increased depending on the direction of deviation from the being-in-register state.

In a third embodiment either the first or the second carrier foil can be controlled by stretching, depending on which foil is leading in front of the other.

The stretching of the carrier foils is preferably achieved by a controlled slow down of the roller from which the carrier foil is drawn off, and by an otherwise constant draw-off speed. The increased tensile stress thereby caused in the carrier foil leads to a controlled stretching of the carrier foil material.

The exactly registered lamination of the two carrier foils in transverse direction constitutes a minor problem, but has to be taken into account mainly with broad carrier foils, since these due to the longitudinal stretching undergo a not unsubstantial reduction of their transverse dimensions. As to equalize these fluctuations in dimension a tension group is provided, which preferably is also controlled with the help of the register marks in the two carrier foils.

The register marks preferably are read in a noncontacting fashion by means of light guides or CCD cameras, either in incident light or in transmitted light. As register marks the security features may serve.

BRIEF DESCRIPTION OF THE DRAWINGS

In the following the invention is explained by way of example with reference to the accompanying figures.

DETAILED DESCRIPTION OF THE INVENTION

Figure 1:
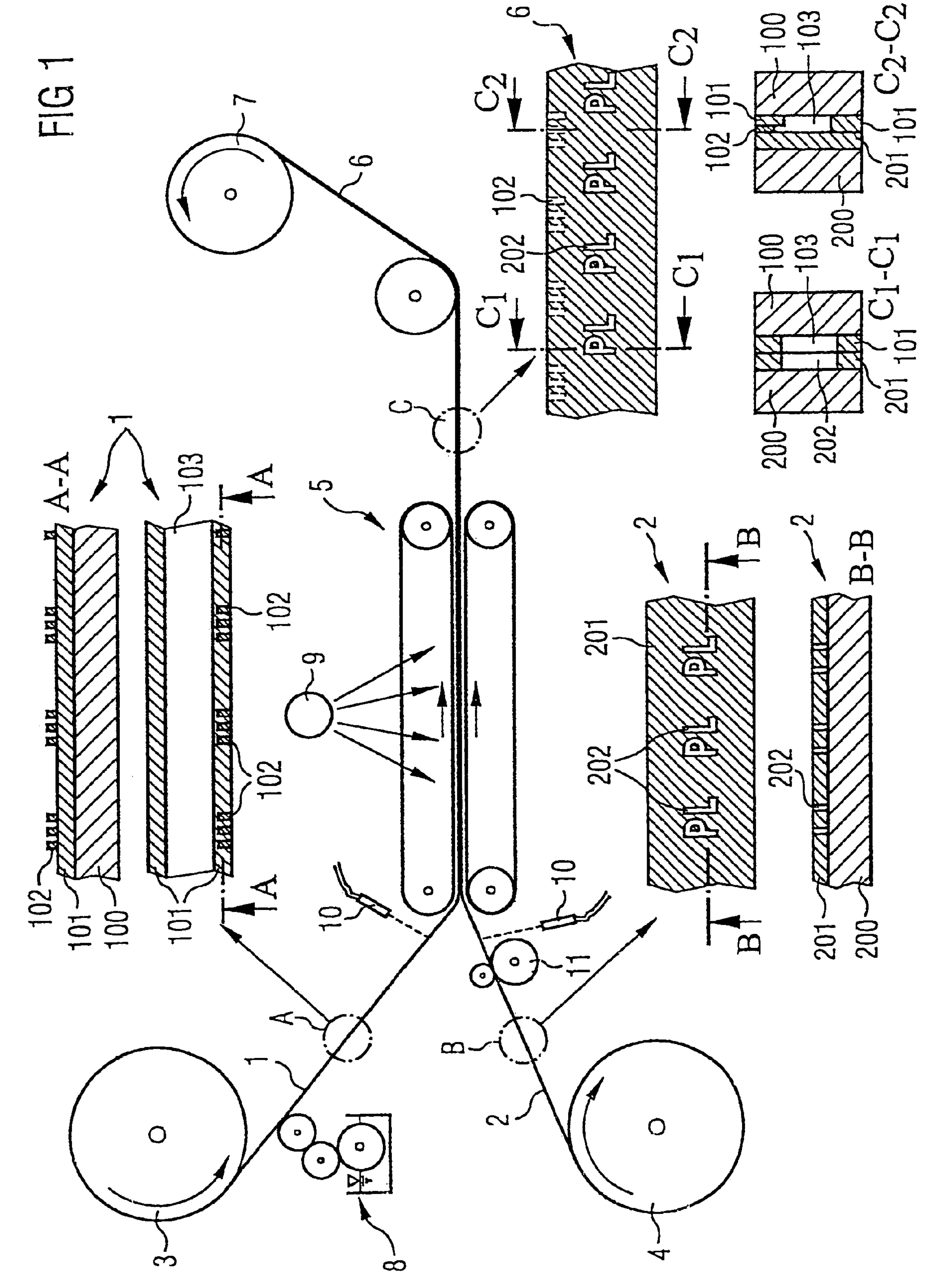
FIG. 1 shows a double belt laminating apparatus.

FIG. 1 shows a double belt laminating apparatus. A first carrier foil 1 and a second carrier foil 2 are drawn off the supply rollers 3, 4, laminated together in a double belt press 5 and subsequently wound up as foil compound 6 on a further supply roller 7 for intermediate storage before the further processing. For this purpose, in an adhesive station 8 to the first carrier foil 1 a radiation-curing, transparent adhesive is applied, which after the bringing together of the two carrier foils 1, 2 in the double belt press 5 is radiation-cured by means of the radiation source 9. Instead of a radiation-curing adhesive other adhesives may be used, for example thermosetting adhesives, for the reason of which the double belt press 5 preferably is heated.

The draw-off speed of the carrier foils 1 and 2 off the supply rollers 3 and 4 at first is determined by the transportation speed of the double belt press 5. According to a first embodiment the supply roller 3 of the first carrier foil 1 is controlled in such a way, i.e. slowed down or accelerated, that it is subject to a defined tensile stress. This tensile stress should be held constant during the entire process. Due to the enormous weight of such supply rollers at the beginning of the unwinding process and the permanently decreasing weight during the unwinding process, it can occur that the supply roller 3 at first is accelerated and in the further course of the unwinding process, optionally, is slowed down. The second carrier foil 2 similarly is subject to tensile stress.

As to ensure, that the security features applied to the first carrier foil 1 are brought together in exact register with the security features applied to the second carrier foil 2, each carrier foil 1, 2 is equipped with register marks, which are detected by means of register mark detectors 10. If the evaluation of the detected register mark positions reveals, that the register marks of the first carrier foil 1 relative to the register marks of the second carrier foil 2 no longer lie within a still acceptable tolerance range, then according to the invention one of the two carrier foils 1, 2 is stretched. The following three variants can be used here:

The two carrier foils 1, 2 normally are subject to the same tensile stress, under which the carrier foils do not undergo a stretching. As soon as the register mark detectors 10 detect, that the security features of one of the two carrier foils are running behind relative to the security features of the other of the two carrier foils, this other foil of the two carrier foils is slightly stretched until the security features of the two carrier foils again are positioned to each other within a predetermined tolerance range. The stretching preferably if effected by a controlled slow down of that supply roller, from which the carrier foil to be stretched is drawn off.

As an alternative the second carrier foil 2 can be formed shorter than the first carrier foil 1, so that the second foil 2 relative to the first carrier foil 1 in principle has to be stretched, so as to permit an exactly registered lamination of the two carrier foils. The required degree of stretching is determined with the help of the register mark detectors 10.

According to a further alternative, the first carrier foil 1 is drawn off while being subject to such a tensile stress that the foil basically is stretched by a predetermined percentage. Normally the second carrier foil 2 then is drawn off the supply roller 4 with the same degree of stretching. If then again with the help of the register mark detectors 10 a deviation from the position of the register marks is determined, then the supply roller 4 depending on the deviation direction is slowed down more or less, so as to relatively intensify or reduce the stretching of the second carrier foil 2.

The carrier foils 1, 2 can have the width of the security element to be produced thereof later, for example, the width of a security thread or strip for bank notes. But preferably they have a multiple of the width, and the security elements produced thereof subsequently are divided out from the laminated foil compound by, for example, cutting the foil compound into threads or strips or by severing out individual security elements from the foil compound, for example by punching out in the form of labels.

In case of broad carrier foils it is expedient to place the register marks at the two outermost edges of the foil, which later during the further processing of the foil compound become waste material. Alternatively, the security features located on the carrier foils can serve as register marks.

For the noncontacting detection of the register marks in incident light or in transmitted light in particular light guides or CCD-cameras are suitable.

In the double belt laminating apparatus specifically shown in FIG. 1 the first carrier foil 1 is subject to a constant tensile stress and the being-in-register state is achieved by stretching the second carrier foil 2. Since the width of the second carrier foil 2 depending on the degree of its longitudinal stretching increases or decreases, a tension group 11 is provided, as to equalize the deviations in transverse direction of the second foil 2. Such a tension group is not required when processing foils of thread or strip width, since the fluctuation in width is minimal. In case of broad foils with a multitude of security elements disposed side-by-side these minimum fluctuations in width, however, add up to a value which cannot to be neglected any more, which as a whole affects the outermost security elements in such a way that the security elements in the middle of the two carrier foils in fact would be laminated in exact register but in the edge area of the carrier foils a deviation from the position of the register marks in transverse direction of the foil would be the case. Tension groups adjustable during the ongoing process are available as so-called expander rollers. These expander rollers have disks, the inclination of which is adjustable, so as to thereby tension the profile belts acting on the carrier foils. The more the discs are inclined the greater the broadening effect on the foils. The adjustment of the expander rollers as to the stretching of the carrier foil in transverse direction is controlled with the help of the register marks.

It is understood, that more than two carrier foils can be laminated to each other by adding equivalent devices to the double belt press apparatus shown in FIG. 1, i.e. in particular by adding one or several further supply rollers.

FIG. 1 shows a specific example for producing a layer compound 6 comprising two carrier foils, wherein the security features are regularly disposed to each other. Here a security thread in an endless form is produced. The detail A of the first foil 1 comprises a carrier foil 100 made of transparent plastic with a vapor-deposited, partial metal layer 101 and with a bar code 102 made of magnetic material. The metal layer 101 leaves free a central strip 103 of the carrier foil 100, through which the carrier foil 100 appears transparent. The magnetic bar codes 102 consist of printing ink containing magnetic particles and are printed onto the metal layer 101 in exact register in such a way, that they are one-sidedly covered by the metal layer 101.

The detail B of the second carrier foil 2 also comprises a carrier foil 200 made of transparent plastic and again a vapor-deposited metal layer 201. The metal layer 201 has gaps produced in the usual fashion in the form of a negative writing 202. The width of the second carrier foil 2 corresponds to the width of the first carrier foil 1. The negative writing 202 is placed in the metal layer 201 at the same position as in the carrier foil 100 of the first foil 1 is placed the transparent area 103. The second carrier foil 2, however, is transparent in the area of the negative writing 202. Due to that the security thread remains transparent in the area of the negative writing 202 even after the lamination of the carrier foils 1, 2.

The detail C in FIG. 2 shows the laminated layer compound in plan view and in two cross sections. One recognizes, that the magnetic bar code 102 lies hidden between the two metal layers 101 and 201 (section $C_2$-$C_2$), whereas the negative writing 202 is visible from both sides of the layer compound due to the transparent area 103 (section $C_1$-$C_1$).

The embodiment of a layer compound 6 shown in FIG. 1 thus comprises security features, which are disposed in exact register to each other both in longitudinal direction of the layer compound and in transverse direction of the layer compound. Since the magnetic bar code 102 of the first carrier foil 1 in longitudinal direction of the foil always lies exactly between the negative writings 202 of the second carrier foil 2 and the negative writings 202 of the second carrier foil 2 in transverse direction of the foil always lie exactly above the transparent area 103 of the first carrier foil 1.

Figure 2A:
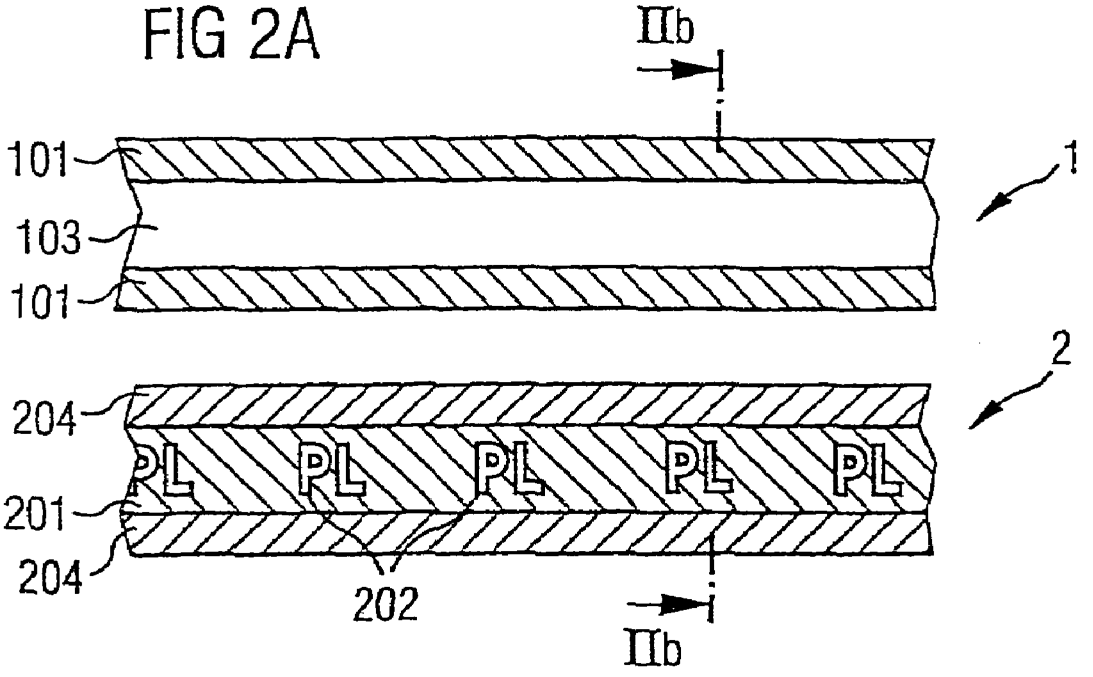
FIGS. 2-8 show various embodiments of a two-foil layer compound.
Figure 2B:
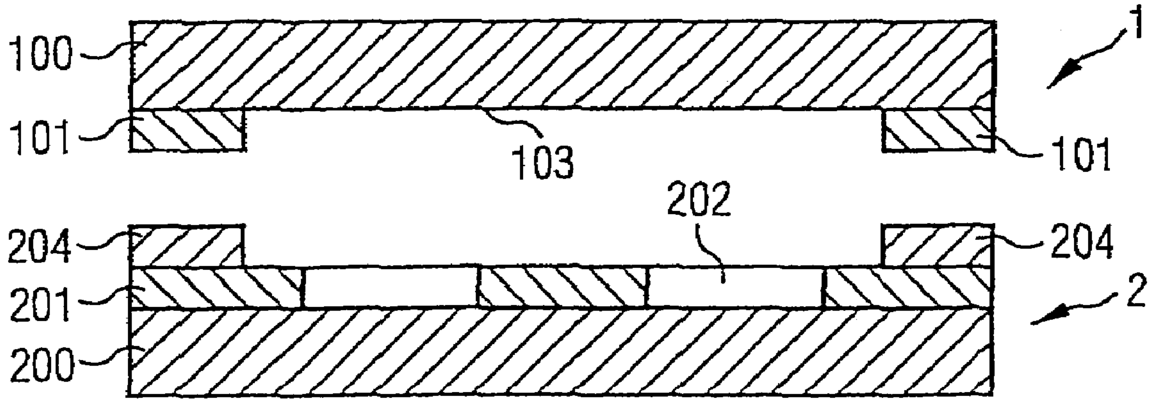

The FIGS. 2*a* and 2*b* show a simple embodiment, wherein is emphasized the being-in-register state of the security features in transverse direction of the foil. The embodiment according to FIG. 2 differs from the variant shown in FIG. 1 merely in that instead of the magnetic bar codes 102 formed on the first carrier foil 100, a magnetic strip 204 extending over the entire length of the layer compound 6 is printed onto the metal layer 201 of the second carrier foil 200 parallel to the negative writing 202. In FIG. 2*b* again a cross section corresponding to the cross sections $C_1$-$C_1$ and $C_2$-$C_2$ of the FIG. 1 is shown, however, at a point of time which is before the lamination of the two carrier foils. When laminating the two carrier foils 100, 200 these are controlled in such a way that the magnetic strips 204 lie hidden between the metal layers 101, 201 of the carrier foils 100, 200, whereas the negative writing 202 due to the transparent area 103 is perceptible from both sides of the layer compound.

Figure 3:
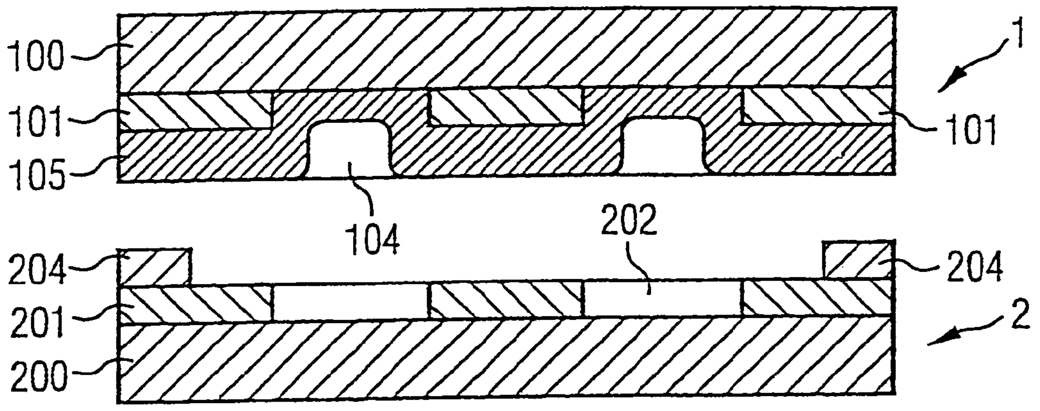

FIG. 3 shows a further embodiment, wherein the being-in-register state in both transverse and longitudinal direction is of importance. Here merely a view in cross section is shown. The second carrier foil 2 is identically structured to the second carrier foil 2 according to FIG. 2 and consequently comprises a transparent carrier foil 200 with a metal layer 201 including negative writing 202 and two magnetic strips 204 printed onto the metal layer 201 parallel to the negative writing. The carrier foil 100 also has an all-over applied metal layer 101, into which is incorporated a negative writing 104. The negative writing 104 of the first carrier foil 100 is identically, although mirror-inverted, to the negative writing 202 of the second carrier foil 200, so that the two negative writings 202, 104 come to lie congruently one above the other when laminating the foils 1, 2. With that on the one hand the magnetic strips 204 are hidden between den metal layers 101, 201 in the final foil compound, and on the other hand the negative writing 104, 202 is visible and legible from both sides of the foil compound.

Additionally, in the embodiment according to FIG. 3 the metal layer 101 is provided all-over with an at least semitransparent, preferably fully transparent coating, which contains fluorescent particles. This coating 105 could also be applied to the metal layer 201 of the other carrier foil 200. Due to the semitransparency of the coating 105 the negative writing 104, 202 remains visible from both viewing sides of the foil compound when viewed in transmitted light. The fluorescent particles form a further authenticity feature of the security element to be produced out of the foil compound. The semitransparent coating can also be designed in another way, for example, as optically variable thin layer structure or other optically variable layers.

Figure 4:
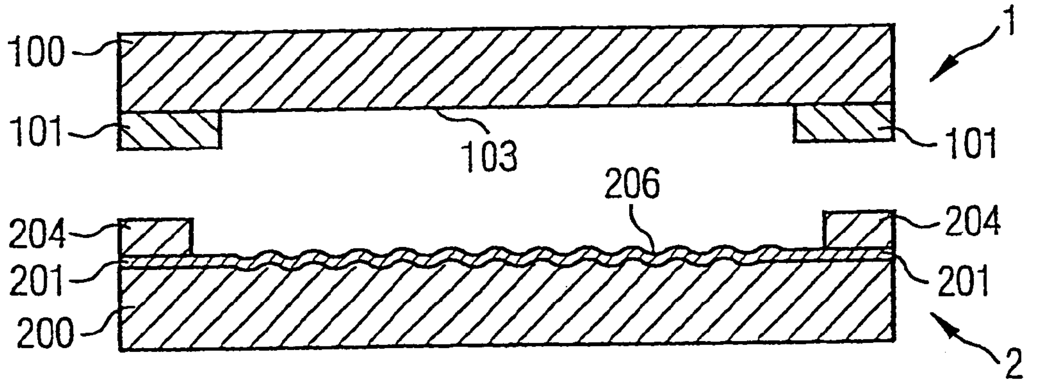

FIG. 4 shows a further embodiment, in this case with integrated optical diffraction structure. The first carrier foil 1 again corresponds to the carrier foil 1 from FIG. 2, which comprises a first transparent carrier foil 100 with a vapor-deposited metal layer 101 in the form of two strips extending parallel to the outer edges of the foil and a central transparent area 103 located in between. The second carrier foil 200 has a diffraction structure 206 embossed into the carrier foil 200 with metal coating 201. The metal coating 201 is printed with a magnetic layer 204 in the form of two strips extending parallel to the foil edge. In the final layer compound the magnetic strips 204 are covered by the metal layers 101 and 201. The diffraction structures are perceptible from both sides of the layer compound as optically variable authenticity feature. If a diffraction structure pattern is selected which in longitudinal direction of the carrier foil is tilt-symmetric, the appearance of the layer compound is identical from both viewing sides. However, if the diffraction structure shows a specific image, every second recurrence of this image would have to be provided in a mirror-inverted fashion, so as to produce a layer compound which is independent of the viewing side.

The diffraction structures 206 not necessarily have to be embossed into the carrier foil 200. It is equally possible to apply exactly registered a transfer element having diffraction structures to the carrier foil 200. But instead also in this embodiment other optically variable security features can be provided, such as for example thin-layer structures and the like.

Figure 5:
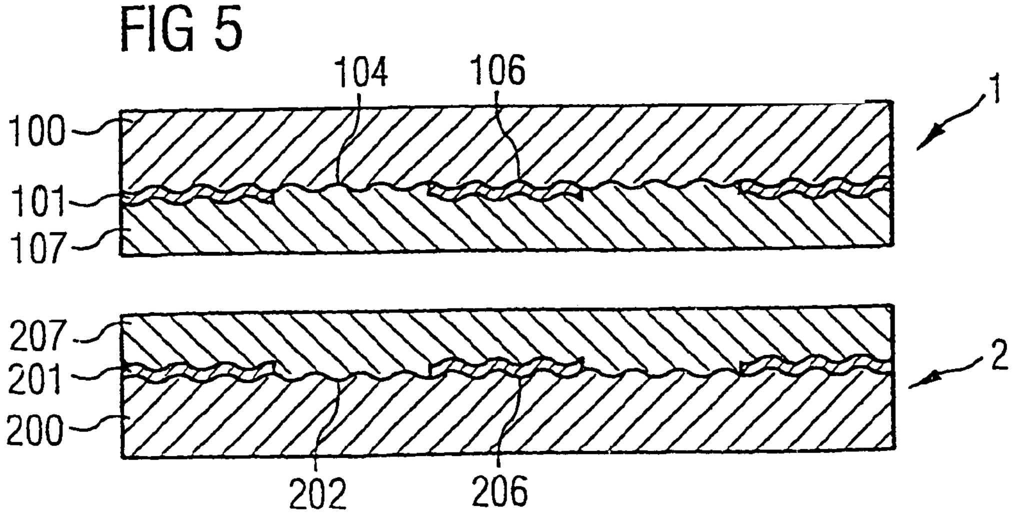

FIG. 5 shows a further embodiment, in which the two carrier foils 1, 2 each have diffraction structures and a negative writing, which in the final layer compound lie congruent one above the other. Into the carrier foils 100, 200 different diffraction structures 106, 206 are embossed. The diffraction structures 106, 206 are covered with metal layers 101, 201, which, however, in this case are not applied all-over, but which each have gaps 104, 202. The gaps 104 of the metal layer 101 of the first carrier foil 100 are identically, although mirror-inverted, to the gaps 202 in the metal layer 201 of the second carrier foil 200, so that they lie congruently one above the other in the completed foil compound and are perceptible from both viewing sides of the foil compound at least in transmitted light. The metalized diffraction structures of the two carrier foils are each protected by transparent lacquer layers 107, 207. This facilitates the intermediate storage and subsequent lamination of the two carrier foils 1, 2. The gaps 104, 202 can form any patterns and alphanumeric characters, just as in the aforementioned examples.

The security element according to FIG. 5 is particularly suitable for the use as a label above a hole in a bank note or another security document. The different diffraction structures 106 and 206, for example, can be the front view and rear view of a head, building or another object, so that this object dependent on the viewing side of the document appears from front or from rear.

Figure 6:
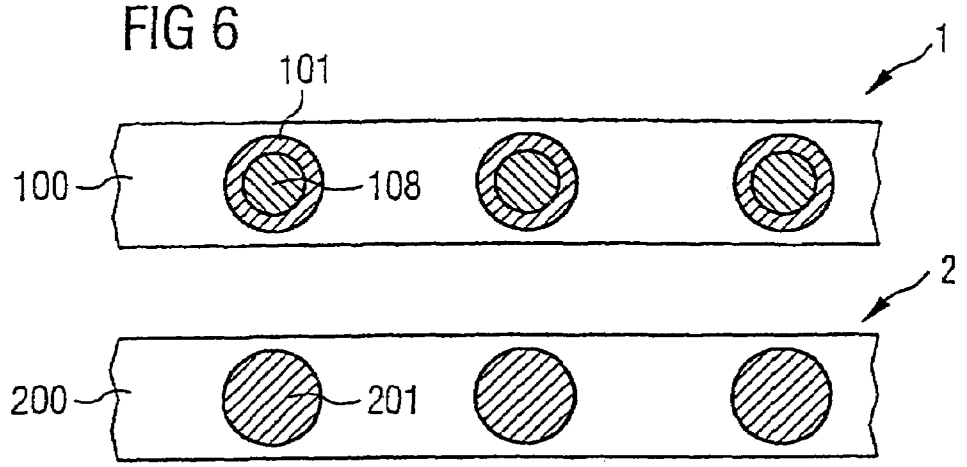

FIG. 6 shows a further embodiment, wherein again is emphasized an exactly registered lamination in longitudinal and transverse direction of the foil material. In this case circular-shaped sections of the first carrier foil 100 are all-over provided with a metal layer 101. Onto each of these metal layer circles is printed in exact register a circular, but magnetic layer 108. The second carrier foil 200 has merely corresponding circular metal layers 201. By means of an exactly registered lamination in the final foil compound the metal layer circles 108 are hidden between the two metal layers 101, 201.

Figure 7:
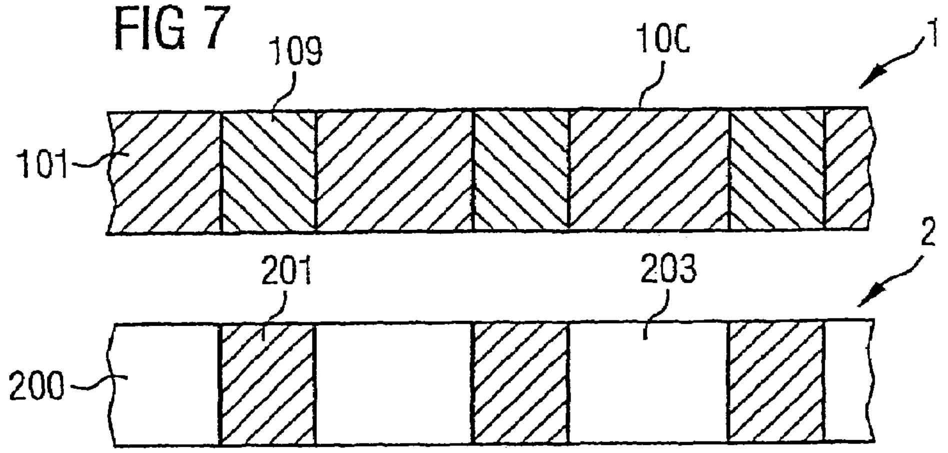

FIG. 7 shows an embodiment wherein is emphasized mainly the exactly registered lamination in longitudinal direction of the foil. In this case the first carrier foil 100 carries an all-over applied metal layer 101 with bars 109 made of magnetic material which are printed on in defined spacing. The second carrier foil 200 has metal layers 201 located in corresponding spacing. In the areas in between 203 the carrier foil 2 remains transparent. By means of an exactly registered lamination of the two carrier foils 1, 2 in longitudinal direction of the foil the magnetic bars 109 are hidden between the metal layers 101 and 201.

Figure 8:
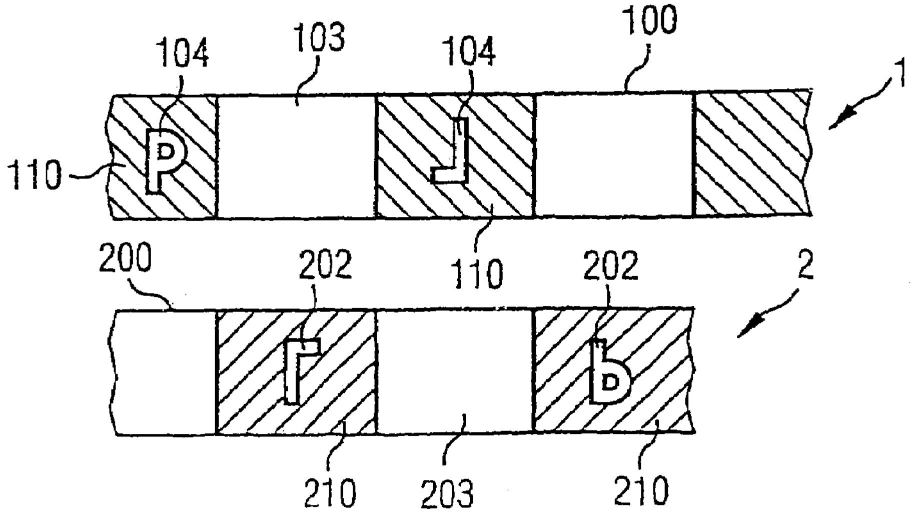

FIG. 8 shows a further embodiment. In this case the first carrier foil 100 in certain areas is coated with a first coating 110, which has a first colour and, for example, is formed by a coloured metal. The carrier foil 100 remains uncoated in the areas 103 located between the colour layers 110 and therefore transparent. The second carrier foil 200 in certain areas is coated with a colour layer 210, the colour of which differs from the colour layer 110 of the first carrier foil 100. That areas of the carrier foil 200 lying in between 203 again remain transparent. The transparent areas 103, 203 in dimension and relative position correspond to the colour layer areas 110 or 210 of the respective other carrier foil. During the lamination of the two carrier foils 1,2 a foil compound is the result, which altogether is not transparent and is marked by areas of different colours regularly spaced apart.

Additionally, the colour layers 110, 210 of the embodiment according to FIG. 8 each have gaps 104 or 202, which complement each other in the final foil compound to form a negative writing "PL". The negative writing is alternately provided rightreading and mirror-inverted, so that it is legible independent of the viewing side.

The invention claimed is:

1. A method for producing a layer compound (6) with at least two security features disposed in register to each other, comprising the following steps:

providing a first carrier foil (100) with at least one first security feature and first register marks, providing a second carrier foil (200) with at least one second security feature and second register marks, joining the first carrier foil to the second carrier foil, at least one of the two carrier foils being under tensile stress and at least one of the second or the first carrier foil being controlled in longitudinal direction and transverse direction with the help of the first and second register marks in such a way, that a layer compound is the result, in which the first and second security features are disposed in register to each other, whereas the controlling of at least one of the second carrier foil (200) or the first carrier foil (100) is effected by stretching the carrier foil in longitudinal direction of the carrier foil.

2. The method according to claim 1, wherein the second carrier foil (200) is shorter than the first carrier foil (100) and is stretched relative to the first carrier foil (100).

3. The method according to claim 1, wherein the first carrier foil (100) due to the tensile stress undergoes a constant stretching in longitudinal direction of the carrier foil and the second carrier foil (200) is stretched relative to the stretching of first carrier foil (100).

4. The method according to claim 1, wherein the carrier foils (100, 200) are provided on rollers (3, 4) and are drawn off the rollers, the stretching of at least one of the first and second carrier foil (100 or 200) in longitudinal direction of the carrier foil being achieved by a controlled slow down of this roller when drawing off the carrier foil from the respective roller.

5. The method according to claim 1, wherein a registered joining of the two carrier foils (100, 200) with respect to their longitudinal edges is achieved by means of a tension group (11).

6. The method according to claim 1, wherein the tension group is controlled with the help of the first and second register marks.

7. The method according to claim 1, wherein the register marks are read by means of light guides or CCD-cameras.

8. The method according to claim 1, wherein the security features are used as register marks.

9. The method according to claim 1, wherein the layer compound is divided into endless threads or endless strips.

10. A method for producing a security element comprising the procedure steps according to claim 1, wherein from the layer compound (6) a security element with its final transverse and longitudinal dimensions is divided out.

* * * * *